United States Patent
Okada

(10) Patent No.: US 9,421,466 B2
(45) Date of Patent: Aug. 23, 2016

(54) MUSIC GAME WHICH CHANGES SOUND BASED ON THE QUALITY OF A PLAYER'S INPUT

(71) Applicant: SQUARE ENIX CO., LTD., Tokyo (JE)

(72) Inventor: Takuya Okada, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 172 days.

(21) Appl. No.: 14/223,158

(22) Filed: Mar. 24, 2014

(65) Prior Publication Data
US 2014/0302925 A1   Oct. 9, 2014

(30) Foreign Application Priority Data
Apr. 4, 2013   (JP) ................................ 2013-078870

(51) Int. Cl.
| A63F 9/24 | (2006.01) |
| A63F 13/44 | (2014.01) |
| A63F 13/814 | (2014.01) |
| A63F 13/5375 | (2014.01) |
| A63F 13/92 | (2014.01) |

(52) U.S. Cl.
CPC ........... *A63F 13/44* (2014.09); *A63F 13/5375* (2014.09); *A63F 13/814* (2014.09); *A63F 13/92* (2014.09)

(58) Field of Classification Search
CPC . A63F 13/44; A63F 13/12; A63F 2300/5553
See application file for complete search history.

(56) References Cited

U.S. PATENT DOCUMENTS

| 6,390,923 B1 * | 5/2002 | Yoshitomi | A63F 13/00 434/307 R |
| 6,541,692 B2 * | 4/2003 | Miller | G10H 1/0058 84/477 R |
| 6,905,413 B1 * | 6/2005 | Terao | G10H 1/0058 434/250 |
| 2005/0101364 A1 | 5/2005 | Onoda et al. | |
| 2005/0255914 A1 * | 11/2005 | McHale | A63F 13/10 463/31 |
| 2007/0234881 A1 * | 10/2007 | Takehisa | G09B 15/023 84/609 |
| 2008/0113698 A1 * | 5/2008 | Egozy | A63F 13/12 463/7 |
| 2009/0042650 A1 * | 2/2009 | Chiwata | A63F 13/06 463/37 |
| 2009/0104956 A1 * | 4/2009 | Kay | A63F 13/10 463/7 |
| 2009/0258702 A1 * | 10/2009 | Flores | A63F 13/06 463/35 |
| 2009/0312106 A1 * | 12/2009 | Okamura | A63F 13/06 463/43 |

FOREIGN PATENT DOCUMENTS

JP         2005-087323         4/2005

OTHER PUBLICATIONS

Wikipedia, RockBand_(iOS)_Wikipedia.pdf, 2009-2015, p. 2.*

* cited by examiner

*Primary Examiner* — Steve Rowland
(74) *Attorney, Agent, or Firm* — Greenblum & Bernstein, P.L.C.

(57) ABSTRACT

A game recording medium with an enhanced fun is provided which can allow a player to enjoy a game without damaging a feeling as if the player played a musical instrument or conducted an orchestra even when the player cannot perform an operation input matched with an indication sign. Time is counted with a start of playing a piece of music and an indication sign is displayed on a time axis. When the indication sign reaches a criterion line, a sensed input operation is analyzed. The analysis result is determined on the basis of a criterion value corresponding to the indication sign. When it is determined a proper operation is not performed, music change information is specified on the basis of the analysis result and the criterion value, and a pitch, a tempo, and the like of the music data are controlled on the basis of the specified change information.

8 Claims, 10 Drawing Sheets

FIG. 8

| | | ANALYSIS RESULT | DEGREE OF CHANGE PITCH AND TEMPO |
|---|---|---|---|
| TIPPING TAP | DIRECTION VECTOR | INNER PRODUCT WITH CRITERION VECTOR 0.9 TO 0.95 | 9/10 TIMES OF REFERENCE TEMPO |
| | | INNER PRODUCT WITH CRITERION VECTOR 0.8 TO 0.9 | 8/10 TIMES OF REFERENCE TEMPO |
| | SHIFT | LESS THAN -10% AND EQUAL TO OR MORE THAN -20% OF CRITERION VALUE | LOWER SEMITONE FROM REFERENCE TONE |
| | | LESS THAN -20% OF CRITERION VALUE | LOWER WHOLE TONE FROM REFERENCE TONE |
| | | MORE THAN 10% AND EQUAL TO OR LESS THAN 20% OF CRITERION VALUE | RAISE SEMITONE FROM REFERENCE TONE |
| | | MORE THAN 20% OF CRITERION VALUE | RAISE WHOLE TONE FROM REFERENCE TONE |

FIG. 9

| | | ANALYSIS RESULT | LIMIT VALUE OF PITCH AND TEMPO |
|---|---|---|---|
| TIPPING TAP | DIRECTION VECTOR | INNER PRODUCT WITH CRITERION VECTOR 0.9 TO 0.95 | 9/10 TIMES OF REFERENCE TEMPO |
| | | INNER PRODUCT WITH CRITERION VECTOR 0.8 TO 0.9 | 8/10 TIMES OF REFERENCE TEMPO |
| | SHIFT | LESS THAN -10% AND EQUAL TO OR MORE THAN -20% OF CRITERION VALUE | LOWER SEMITONE FROM REFERENCE TONE |
| | | LESS THAN -20% OF CRITERION VALUE | LOWER WHOLE TONE FROM REFERENCE TONE |
| | | MORE THAN 10% AND EQUAL TO OR LESS THAN 20% OF CRITERION VALUE | RAISE SEMITONE FROM REFERENCE TONE |
| | | MORE THAN 20% OF CRITERION VALUE | RAISE WHOLE TONE FROM REFERENCE TONE |

MUSIC GAME WHICH CHANGES SOUND BASED ON THE QUALITY OF A PLAYER'S INPUT

CROSS REFERENCE TO RELATED APPLICATION

The present disclosure relates to subject matter contained in Japanese Patent Application No. 2013-078870, filed on Apr. 4, 2013, the disclosure of which is expressly incorporated herein by reference in its entirety.

TECHNICAL FIELD

The present invention relates to a computer-readable recording medium having recorded thereon a game program for causing a game to progress by causing a user to perform a predetermined operation to be matched with an indication sign displayed on a display device.

BACKGROUND ART

In the past, music games have been enjoyed in which the progress of a game is controlled by causing an indication sign having a shape of a musical instrument such as a drum to move along a predetermined path on a display screen so as to be matched with a piece of music, determining a propriety of an operation input when the indication sign reaches a predetermined criterion position, and adding a score (for example, see JP-A-2005-87323). In most of such music games, when an operation input to the indication sign could not be performed, a part of a piece of music to be output is not output merely instead of changing the piece of music.

SUMMARY OF INVENTION

Technical Problem

In some music games, for example, by performing an operation input matched with indication signs, a player can enjoy the music games with a feeling as if the player played a musical instrument or a feeling as if the player conducted an orchestra. However, when an operation input matched with an indication sign is not performed and when a piece of music is output normally or a part of the piece of music is not output merely, the feeling as if the player played a musical instrument or conducted an orchestra may be damaged. That is, even when a player fails in the playing or conducting, an uncomfortable sound is not output and a piece of music is output normally.

The invention is made to solve the above-mentioned problems and an object thereof is to provide a game recording medium with an enhanced fun which can allow a player to enjoy a game without damaging a feeling as if the player played a musical instrument or conducted an orchestra even when the player cannot perform an operation input matched with an indication sign.

Solution to Problem

According to a non-limiting aspect, a computer-readable recording medium of the present invention is a computer-readable recording medium having recorded thereon a game program which is executed by a computer apparatus including an input device, a display device, and a sound reproducing device, and which causes the computer apparatus to serve as: an input operation receiver that receives a player's input operation to the input device; a music data storage that stores music data; a music player that plays a piece of music through the use of the sound reproducing device; an indication sign displayer that displays an indication sign correlated with an input operation to be input by the player through the use of the input device on a display screen in synchronization with the playing of the piece of music in the music player; and an input operation determiner that determines a propriety of the player's input operation on the basis of the input operation, which corresponds to the indication sign displayed by the indication sign displayer, to be input by the player, wherein the music player changes and reproduces the music data stored in the music data storage depending on the determination result of the input operation determiner.

It is determined whether an input operation to be input based on an indication sign is performed and the music data is controlled depending on the determination result. Accordingly, when an operation input matched with the indication sign is not performed, a piece of music can be played in an abnormal manner such as outputting a sound out of tune or slowing down the tempo of the piece of music without normally outputting the piece of music. Accordingly, when the input operation to be input by the player is not performed, a player character does not succeed in playing or conducting and a part of the piece of music is played with an uncomfortable feeling.

In the computer-readable recording medium of the present invention, it is preferable that the music player reproduces the music data stored in the music data storage with a pitch, a tempo, and/or a formant of the music data changed depending on the determination result of the input operation determiner.

For example, when music data has an MIDI format, it is possible to change a pitch, a tempo, and/or a formant of the music data. By controlling these three factors, it is possible to prevent the pitch from being changed when the tempo is changed or to prevent the playing speed of music or the formant from being changed when the pitch is changed. That is, it is possible to change the tempo while maintaining the pitch of the music data or to change the pitch while maintaining the playing speed or the formant.

In the computer-readable recording medium of the present invention, it is preferable that the game program causes the computer apparatus to further serve as: a criterion value storage that stores a criterion value for determining a propriety of the player's input operation in correlation with the indication sign; and an input operation analyzer that analyzes the input operation received by the input operation receiver, wherein the input operation determiner determines the analysis result acquired by the input operation analyzer on the basis of the criterion value stored in the criterion value storage, and wherein the music player determines change details of the music data on the basis of a difference between the criterion value and the analysis result and changes and reproduces the music data on the basis of the determined change details.

A criterion value determined for each indication sign is compared with the analysis result of the player's input operation and the change details of the music data is determined on the basis of the difference between the criterion value and the analysis result. Accordingly, the larger the difference between the criterion value and the analysis result becomes, the larger the degree of change of the music data can become. That is, the larger the difference between the input operation determined by the corresponding indication sign and to be input by the player and the input operation actually input by the player becomes, the larger the degree of change of the pitch or the tempo of the music data can become and the larger the uncomfortable feeling can become. As a result, it is possible to output a piece of music matched with a degree of skill of the player's input operation.

In the computer-readable recording medium of the present invention, it is preferable that the music player determines change details of the music data depending on a player character appearing in the game, and changes and reproduces the music data stored in the music data storage by changing a pitch, a tempo, and/or a formant of the music data.

For example, in a game concept in which the player's input operation corresponding to indication signs in the course of playing a piece of music corresponds to conduct of an orchestra by a player character appearing in the game, it is possible to give a difference to the degree of change of the music data when the input operation matched with the indication sign is not performed depending on the type of the player character. A player can select a player character to be operated by the player himself or herself out of plural characters. Player characters conducting an orchestra may have differences in personality and skill. Accordingly, even when an input operation corresponding to an indication sign is not performed, the pitch may be slightly changed for a certain player character and the pitch may be greatly changed for another player character.

In the computer-readable recording medium of the present invention, it is preferable that the computer-readable recording medium according to claim 1, wherein the game program causes the computer apparatus to further serve as a time axis displayer that displays a time axis and a criterion position set on the time axis on the display screen, wherein the indication sign displayer displays the indication sign to shift on the time axis in synchronization with the playing of a piece of music in the music player, and wherein the input operation determiner determines a propriety of the player's input operation through the use of the input operation receiver on the basis of the input operation, which corresponds to the indication sign, to be input by the player in the period of time until the indication sign displayed to move by the indication sign displayer passes through the criterion position after reaching the criterion position.

For example, a time axis is displayed in the horizontal direction of the display screen and the indication signs move from left to right on the time axis. A criterion position is set on the time axis and an input operation corresponding to an indication sign is required for the player until the indication sign passes through the criterion position after reaching the criterion position.

In the computer-readable recording medium of the present invention, it is preferable that the input device and the display device are a touch panel type display device, and wherein the input operation is a touch operation with the touch panel type display device.

By applying the touch panel type display device as the input device and the display device and performing a touch operation with a finger or a stylus, it is possible to enjoy a music game with an exhilarating touch play.

According to another non-limiting aspect, a game apparatus of the present invention is a game apparatus having an input device, a display device and a sound reproducing device, comprising: an input operation receiver that receives a player's input operation to the input device; a music data storage that stores music data; a music player that plays a piece of music through the use of the sound reproducing device; an indication sign displayer that displays an indication sign correlated with an input operation to be input by the player through the use of the input device on a display screen in synchronization with the playing of the piece of music in the music player; and an input operation determiner that determines the player's input operation on the basis of an input operation, which corresponds to the indication sign displayed by the indication sign displayer, to be input by the player, wherein the music player changes and reproduces the music data stored in the music data storage depending on the determination result of the input operation determiner.

According to still another non-limiting aspect, a game progressing method of the present invention is a game progressing method which is carried out in a computer equipment having an input device, a display device, and a sound reproducing device, comprising steps of: receiving a player's input operation to the input device; playing a piece of music through the use of the sound reproducing device; displaying an indication sign correlated with an input operation to be input by the player through the use of the input device on a display screen in synchronization with the playing of the piece of music; and determining the player's input operation on the basis of the input operation, which corresponds to the indication sign displayed in the step of displaying the indication sign, to be input by the player, wherein the step of playing a piece of music includes changing and reproducing music data stored in a music data storage depending on the determination result in the step of determining the input operation.

According to still another non-limiting aspect, a game system of the present invention is a game system comprising: a client apparatus that has an input device, a display device, and a sound reproducing device; and a server apparatus that is able to communicate with the client apparatus, wherein the client apparatus includes an input operation receiver that receives a player's input operation to the input device; an input operation information transmitter that transmits input operation information on the input operation received by the input operation receiver to the server apparatus; an information receiver that receives game image information for displaying a game image including an indication sign correlated with an input operation to be input by the player through the use of the input device on the display device and music data for playing a piece of music through the use of the sound reproducing device from the server apparatus; a game image displayer that displays the game image on the display device on the basis of the game image information received by the information receiver; and a music player that plays a piece of music through the use of the sound reproducing device on the basis of the music data received by the information receiver, and wherein the server apparatus includes a music data storage that stores music data; an input operation information receiver that receives input operation information from the client apparatus; an input operation determiner that determines the player's input operation depending on the input operation information received by the input operation information receiver on the basis of an input operation, which corresponds to the indication sign included in the game image displayed on the display device, to be input by the player; a music data controller that controls the music data stored in the music data storage on the basis of the determination result of the input operation determiner; a game image information creator that creates the game image information for displaying a game image including the indication sign and indicating a game progressing state based on the determination result of the input operation determiner on the display device; and an information transmitter that transmits the music data controlled by the music data controller and the game image information created by the game image information creator to the client apparatus.

A computer-readable recording medium of the present invention is a computer-readable recording medium having recorded thereon a game program which is executed by a server apparatus being able to communicate with a client apparatus having an input device, a display device, and a sound reproducing device, and which causes the server apparatus to serve as: a music data storage that stores music data; an indication sign storage that stores an indication sign included in a game image to be displayed on the display device in correlation with an input operation to be input by a player; an input operation information receiver that receives input operation information on the player's input operation to the input device which is received by the client apparatus from the client apparatus; an input operation determiner that determines the player's input operation based on the input operation information received by the input operation information receiver on the basis of the input operation, which corresponds to the indication sign included in the game image to be displayed on the display device, to be input by the player; a music data controller that controls the music data stored in the music data storage on the basis of the determination result of the input operation determiner; a game image information creator that creates game image information for displaying a game image including the indication sign and indicating a game progressing state based on the determination result of the input operation determiner on the display device; and an information transmitter that transmits the music data controlled by the music data controller and the game image information created by the game image information creator to the client apparatus.

The invention can be applied to a so-called cloud game as well as the case where a game is played using only a stationary game apparatus or a portable game apparatus.

One or more defections are solved by the above-mentioned aspects of the invention. That is, it is possible to provide a recording medium, a game apparatus, and a game progressing method with an enhanced fun which can allow a player to enjoy a game without damaging a feeling as if the player played a musical instrument or conducted an orchestra even when the player cannot perform an operation input matched with an indication sign.

BRIEF DESCRIPTION OF THE DRAWINGS

FIG. 8 is a diagram illustrating a correlation between a difference of an analysis result from a criterion value and changes of a pitch and a tempo according to at least one embodiment of the invention.

FIG. 9 is a diagram illustrating a correlation between a difference of an analysis result from a criterion value and a limit of a degree of change of a pitch and a tempo according to at least one embodiment of the invention.

DESCRIPTION OF EMBODIMENTS

A game apparatus according to an embodiment of the invention will be described below. The game apparatus is not particularly limited and a portable terminal such as a smartphone, a mobile phone, and a portable dedicated game apparatus, or a stationary game apparatus can be used. In this embodiment, a smartphone is employed as the game apparatus.

Figure 1:
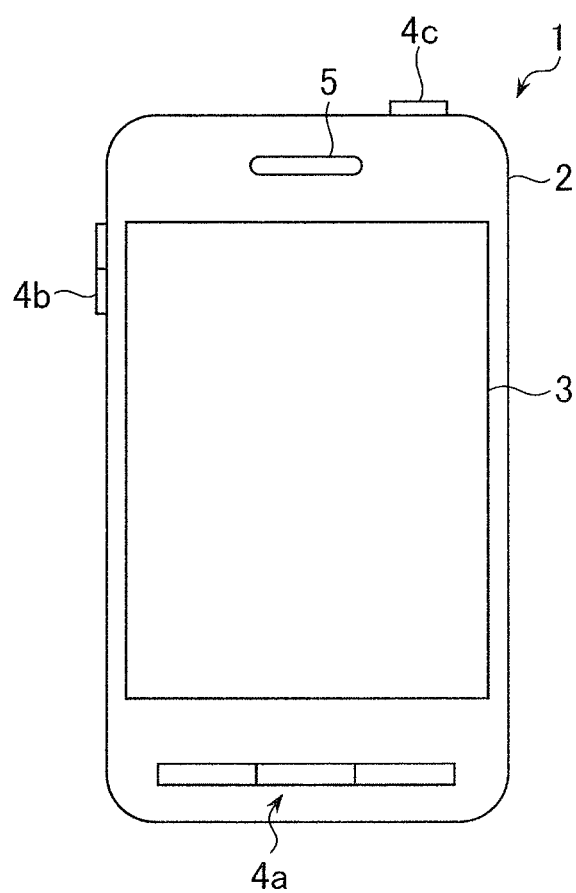
FIG. 1 is a front outside view of a game apparatus according to at least one embodiment of the invention.

FIG. 1 is a front outside view of a game apparatus according to at least one embodiment of the invention. A game apparatus 1 includes a body 2, a liquid crystal monitor 3, an input unit 4, and a speaker 5. The liquid crystal monitor 3 is disposed substantially in a rectangular shape at the center of the surface of the body 2. The liquid crystal monitor 3 is of a touch panel type and can detect a touch position by the use of a touch input detecting unit when a finger or a touch pen touches the surface of a touch panel. A player can perform an input operation matched with an indication sign by operating the touch panel.

The input unit 4 includes a menu button 4a, a volume button 4b, and a power supply button 4c. The menu button 4a is disposed in the lower part of the liquid crystal monitor 3 of the body 2. By pushing the menu button 4a, a menu screen for variously setting the game apparatus 1 can be read out. The volume button 4b is disposed in the upper part of the side surface of the body 2. A sound volume can be adjusted by the volume button 4b. The power supply button 4c is disposed on the top surface of the body 2. By pushing the power supply button 4c, the power supply of the game apparatus 1 is turned on or off or the operating state is changed to a sleep state. The speaker 5 is built in the body 2 and an output port is disposed in the upper part of the liquid crystal monitor 3 of the body 2.

Figure 2:
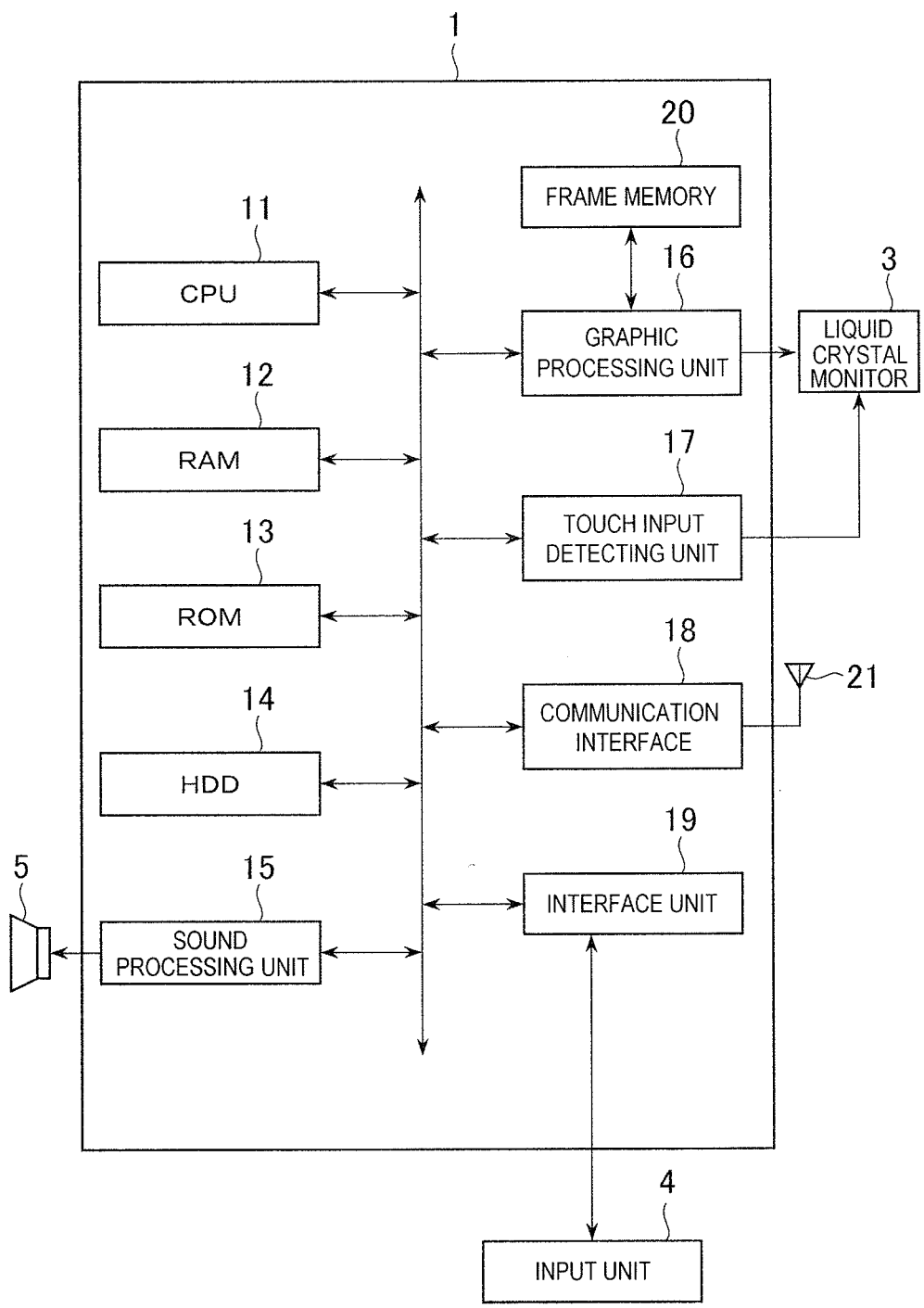
FIG. 2 is a block diagram illustrating a configuration of a game apparatus according to at least one embodiment of the invention.

FIG. 2 is a block diagram illustrating a configuration of a game apparatus according to at least one embodiment of the invention. The game apparatus 1 includes a central processing unit (CPU) 11, a random access memory (RAM) 12, a read only memory (ROM) 13, a hard disk drive (HDD) 14, a sound processing unit 15, a graphic processing unit 16, a touch input detecting unit 17, a communication interface 18, and an interface unit 19, which are connected to each other via an internal bus.

The CPU 11 executes a game program stored in the ROM 13 and controls the game apparatus 1. The CPU 11 has an internal timer for counting time. The RAM 12 serves as a work area of the CPU 11. The HDD 14 serves as a storage area for storing programs or data.

The CPU 11 reads a program and data necessary for progress of a game from the RAM 12 and performs processing of the program. The CPU 11 processes the program and the data loaded into the RAM 12, outputs a sound output command to the sound processing unit 15, and outputs an imaging command to the graphic processing unit 16.

The sound processing unit 15 is connected to the speaker 5. When the CPU 11 outputs the sound output command to the sound processing unit 15, the sound processing unit 15 outputs a sound signal to the speaker 5.

The graphic processing unit 16 is connected to the liquid crystal monitor 3. When the CPU 11 outputs the imaging command to the graphic processing unit 16, the graphic processing unit 16 develops an image in a frame memory (frame buffer) 20 and outputs a video signal for displaying an image on the liquid crystal monitor 3. The graphic processing unit 16 creates an image in the unit of frames. One frame time of an image is, for example, 1/30 seconds.

The input unit 4 is connected to the interface unit 19. A player's input information from the input unit 4 and the touch input detecting unit 17 is stored in the RAM 12 and the CPU 11 performs various calculation operations on the basis of the input information.

The communication interface 18 is connected to a communication network by a wireless communication. The communication interface 18 wirelessly communicates with another game apparatus 1 via a communication unit having an antenna 21 and transmits game information and the like thereto.

Embodiments of the invention will be described below in brief. In an embodiment of the invention, plural types of indication signs are prepared in advance and requested touch operations are different depending on the indication signs. Here, the indication sign is displayed on a display screen and indicates an operation to be input by a player via a touch panel and the shape or pattern to be displayed varies depending on the operation required for the player. The shape or pattern of an indication sign can be appropriately set, but it is preferable that the shape or pattern be set to a shape or pattern which can easily image an operation required for a player. The touch operation means an operation of bringing a finger or a stylus in contact with the display screen of a touch panel type.

Figure 3:
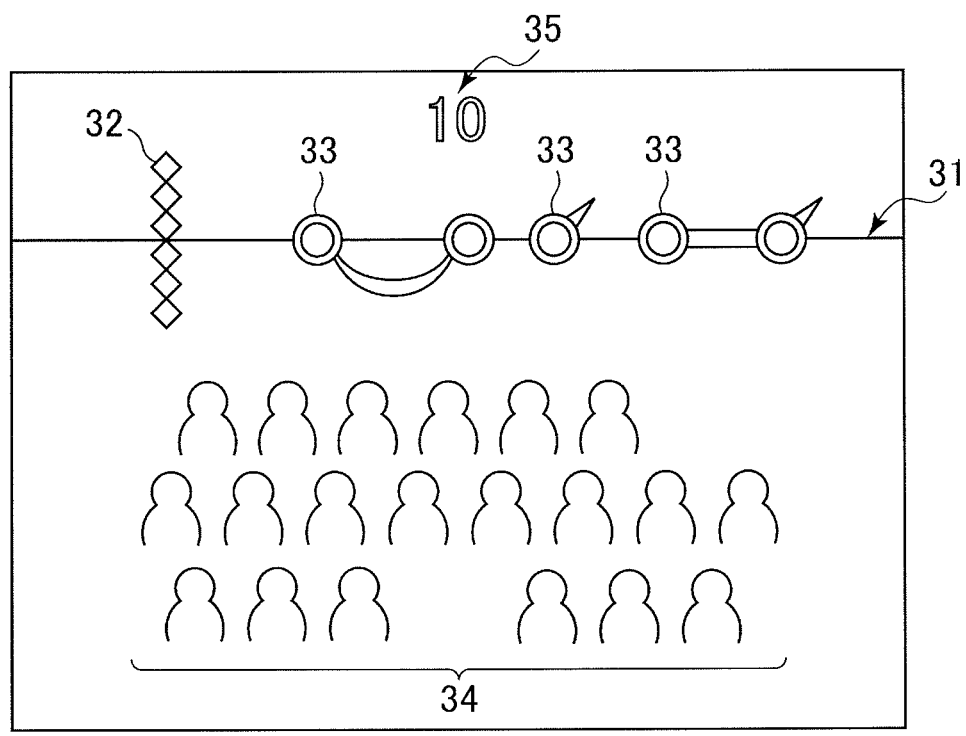
FIG. 3 is a diagram illustrating an example of a display screen of a game apparatus according to at least one embodiment of the invention.

FIG. 3 is a diagram illustrating an example of a display screen of a game apparatus according to at least one embodiment of the invention. As illustrated in FIG. 3, above the center of the display screen, a straight time axis 31 is disposed from the left end to the right end of the display screen. On the left side of the center of the time axis 31, a criterion line 32 indicating a criterion position which serves as a reference for determining an input operation when an indication sign 33 passes through the criterion line 32 is disposed. The criterion line 32 is displayed in the direction perpendicular to the time axis 31.

An indication sign 33 is first displayed at the right end of the time axis 31 and moves to the left at a constant speed with the lapse of time. Plural indication signs 33 can be displayed on the time axis 31 and indication signs 33 having different shapes or patterns are employed depending on the input operations required for a player. A player needs to perform an input operation on the touch panel when the corresponding indication sign 33 reaches the criterion line 32.

The indication sign 33 moves from the right end to the left end along the time axis 31 and is not displayed when it reaches the left end. When an indication sign 33 reaches the criterion line 32, a player's input to the touch panel is sensed until the entire indication sign 33 passes through the criterion line 32. The sensed input operation is determined on the basis of the criterion value corresponding to the indication sign 33. Depending on the determination result, a score of the player is added and the piece of music to be output is controlled.

Plural characters 34 playing various musical instruments are displayed at the center of the display screen. The characters 34 take charge of string instruments such as a violin, a cello, and a contrabass, woodwind instruments such as a flute, an oboe, and a clarinet, brass wind instruments such as a horn, a trumpet, and a trombone, and percussion instruments such as cymbals, and the characters 34 play corresponding musical instruments. The display of the characters 34 varies in synchronization with a piece of music to be played.

A point 35 acquired by a player with the progress of the game is displayed at the center of the upper side of the display screen. When the player succeeds in the input operation requested by the indication sign 33, the point 35 increases and competition of a score of the points when the performance (playing) of the piece of music ends can be compared can be enjoyed as a game.

When the player fails in the input operation requested by the indication sign 33, the point 35 is not particularly changed or the point 35 may be subtracted. When the player fails in the requested input operation, for example, a pitch, a tempo, a formant or the like of music data having the MIDI format is changed and output. Accordingly, the changed part of the music data gives an uncomfortable feeling such as out of tune or out of tempo, in comparison with the original piece of music. It is determined which of a pitch, a tempo, and the like to change and to what to set the degree of change, depending on the difference between the criterion value corresponding to the indication sign 33 and the analysis result of the player's input operation.

Before starting playing of a piece of music, that is, before starting a main game of performing an input operation corresponding to an indication sign, a player character taking charge of conducting an orchestra is designated randomly or selected by a player. When the player fails to input an input operation requested by the indication sign 33, the degree of change of a pitch, a tempo, and the like can be determined depending on the characteristics of the player character.

Figure 4A:
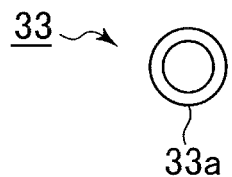
FIGS. 4A to 4F are diagrams illustrating examples of indication signs to be displayed on a display screen of a game apparatus according to at least one embodiment of the invention.

The indication sign 33 will be described below in detail. FIGS. 4A to 4F are diagrams illustrating examples of indication signs to be displayed on the display screen of the game apparatus according to at least one embodiment of the invention. FIG. 4A illustrates an indication sign 33 of a "tap" and includes a circular mark 33a having a double circle. A "tap" represents the most basic operation and requests for performing a touch operation on the touch panel until the entire indication sign 33 passes through the criterion line 32 on the time axis 31 after reaching the criterion line 32.

Figure 4B:
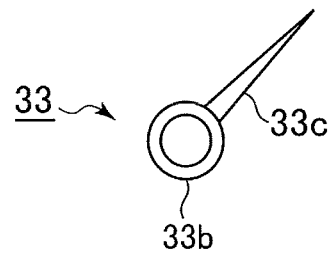

FIG. 4B represents an indication sign 33 of a "tipping tap" and includes a circular mark 33b having a double circle and a direction indicating portion 33c. The direction indicating portion 33c is disposed to come in contact with the outer circle of the circular mark 33b and forms an acute angle in the direction opposite to the center of the circle. The direction of the "tipping tap" is specified by the direction indicated by the acute angle. That is, the "tipping tap" is an operation of shifting to tip the touch panel to a state where a finger or a touch pen (hereinafter, referred to as a finger or the like) does not touch the touch panel while causing the finger or the like to shift in a predetermined direction from a state where the finger or the like touches the touch panel. Here, the predetermined direction is specified by the direction indicated by the acute angle of the direction indicating portion $33c$.

The direction indicating portion $33c$ can indicate any one of eight directions of an upward direction, a downward direction, a left direction, a right direction, a right-upper direction, a left-upper direction, a right-lower direction and a left-lower direction. For example, the player can change the direction of the requested "tipping tap" to correspond to the rhythm, the tempo, and the sound volume of a piece of music, whereby the player can play the game with a feeling like a conductor of an orchestra.

Figure 4C:
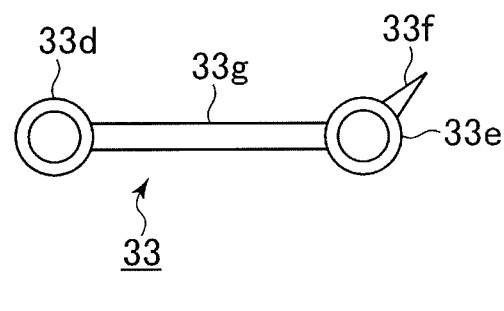

FIG. 4C illustrates an indication sign 33 of a "long pressing and tipping tap" and includes circular marks $33d$ and $33e$ having a double circle and a direction indicating portion $33f$. The circular mark $33d$ and the circular mark $33e$ are connected to each other with a connecting portion $33g$ displayed by two straight lines. The circular mark $33d$ displayed on the left side represents the timing at which the player touches the touch panel with the finger or the like and the circular mark $33e$ represents the timing at which the player tips the touch panel into a state where the touch panel is not touched with the finger or the like. That is, it is requested to touch the touch panel at the timing at which the circular mark $33d$ reaches the criterion line 32, to temporarily continue to touch the touch panel (to continue a long pressing operation), and then to tip the touch panel in a predetermined direction with the finger or the like at the timing at which the circular mark $33e$ reaches the criterion line 32.

Similarly to the "tipping tap", the direction indicating portion $33f$ is disposed to come in contact with the outer circle of the circular mark $33e$ and forms an acute angle in the direction opposite to the center of the circle. The direction of the "long pressing and tipping tap" is specified by the direction indicated by the acute angle. That is, the shift direction in which the touch panel is tipped into a state where the touch panel is not touched is specified by the direction indicated by the direction indicating portion $33f$.

Figure 4D:
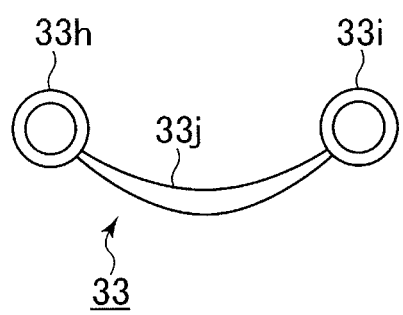

FIG. 4D illustrates an indication sign 33 of a "fluctuation", wherein circular marks $33h$ and $33i$ having a double circle are connected to each other with a connecting portion $33j$ displayed by two curved lines convex to the lower side of the display screen. The circular mark $33h$ displayed on the left side represents the timing at which the player touches the touch panel with the finger or the like and the circular mark $33i$ represents the timing at which the player separates the finger or the like from the touch panel. That is, the "fluctuation" is an operation of causing the finger or the like to shift from left to right while describing an arc in a state where the touch panel is touched with the finger or the touch pen and it is requested to touch the touch panel at the timing at which the circular mark $33h$ reaches the criterion line 32, to cause the touch position to shift from left to right, and to separate the finger or the like from the touch panel at the timing at which the circular mark $33i$ reaches the criterion line 32.

Figure 4E:
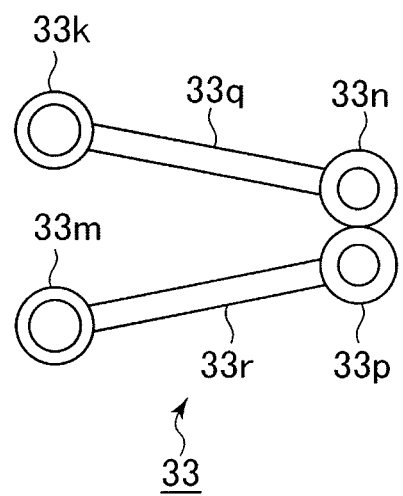

FIG. 4E illustrates an indication sign 33 of a "pinch-in", where circular marks $33k$ and $33n$ having a double circle are connected to each other with a connecting portion $33q$ displayed by two straight lines inclined to the right-lower side. Similarly, circular marks $33m$ and $33p$ are connected to each other with a connecting portion $33r$ displayed by two straight lines inclined to the right-upper side. The circular marks $33n$ and $33p$ located at the right ends of the connecting portions $33q$ and $33r$ are vertically arranged to come in contact with each other. The distance between the circular marks $33k$ and $33m$ represents a distance between the touch positions of two fingers touching the touch panel at the timing at which the player starts a "pinch-in" operation, and the distance between the circular marks $33n$ and $33p$ represents a distance between the touch positions of the fingers at the timing at which the player ends the "pinch-in" operation. The vertical gap between the connecting portions $33q$ and $33r$ is narrowed toward the right side, which represents that the distance between the touch positions of two fingers decreases with the lapse of time.

That is, the "pinch-in" is an operation of reducing the distance between the touch positions in a state where the touch panel is touched with two fingers and it is requested to touch the touch panel at positions spaced by a predetermined gap from each other with two fingers at the timing at which the circular marks $33k$ and $33m$ reach the criterion line 32, to cause the touch positions to shift so as to reduce the distance between the touch positions as if to pinch a thing between the fingers with the lapse of time, and to touch the touch panel at close positions with the two fingers at the timing at which the circular marks $33n$ and $33p$ reach the criterion line 32.

Figure 4F:
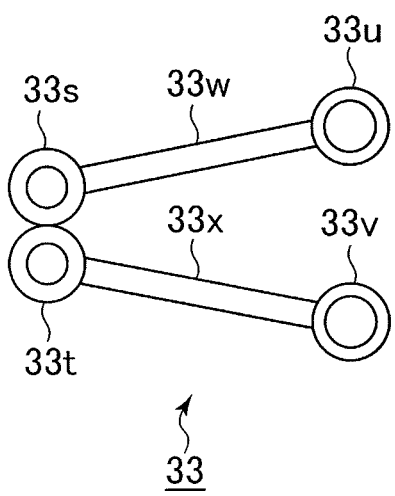

FIG. 4F illustrates an indication sign 33 of a "pinch-out", whereby circular marks $33s$ and $33u$ having a double circle are connected to each other with a connecting portion $33w$ displayed by two straight lines inclined to the right-upper side. Similarly, circular marks $33t$ and $33v$ are connected to each other with a connecting portion $33x$ displayed by two straight lines inclined to the right-lower side. The circular marks $33s$ and $33t$ located at the left ends of the connecting portions $33w$ and $33x$ are vertically arranged to come in contact with each other. The distance between the circular marks $33s$ and $33t$ represents a distance between the touch positions of two fingers touching the touch panel at the timing at which the player starts a "pinch-out" operation, and the distance between the circular marks $33u$ and $33v$ represents a distance between the touch positions of the fingers at the timing at which the player ends the "pinch-out" operation. The vertical gap between the connecting portions $33w$ and $33x$ is broadened to the right side, which represents that the distance between the touch positions of the two fingers increases with the lapse of time.

That is, the "pinch-out" is an operation of increasing the distance between the touch positions in a state where the touch panel is touched with two fingers and it is requested to touch the touch panel at close positions with two fingers at the timing at which the circular marks $33s$ and $33t$ reach the criterion line 32, to cause the touch positions to shift so as to increase the distance between the touch positions by increasing the gap between the fingers with the lapse of time, and to touch the touch panel at positions spaced by a predetermined gap from each other with the two fingers at the timing at which the circular marks $33u$ and $33v$ reach the criterion line 32.

Figure 5:
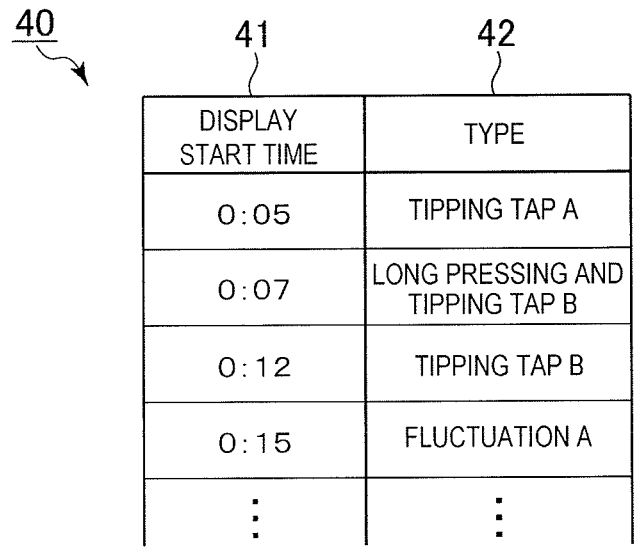
FIG. 5 is a diagram illustrating an indication sign management table according to at least one embodiment of the invention.

An indication sign management table according to an embodiment of the invention will be described below. FIG. 5 is a diagram illustrating an indication sign management table according to at least one embodiment of the invention. A indication sign management table 40 is set in the RAM 12 and is used to specify which indication sign 33 to display out of plural indication signs 33 and to request a player to perform a predetermined input operation in the course of playing a piece of music.

The indication sign management table 40 stores types 42 of the indication signs 33 in correlation with display start times 41. The display start time 41 corresponds to the time elapsing after playing a piece of music is started and represents the time at which a display is started on the display screen for the indication sign 33 specified from the types 42. Therefore, when the time specified by the display start time 41 elapses after playing a piece of music is started, the corresponding indication sign 33 is displayed on the display screen and starts shifting from the right end to the left side of the time axis 31. The indication sign management table 40 is prepared for each piece of music and different indication sign management tables 40 are employed for every piece of music to be played.

Figure 6:
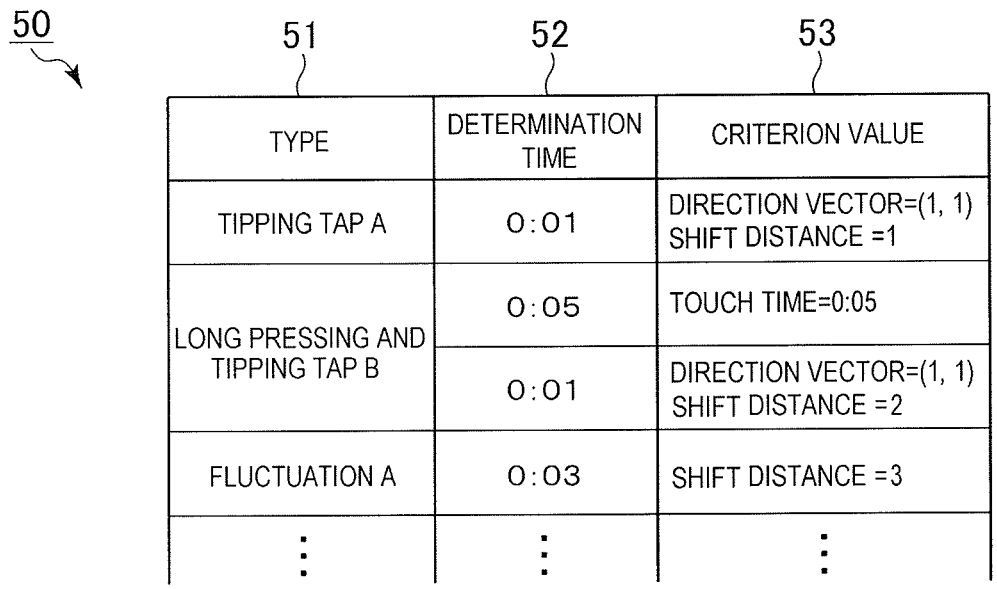
FIG. 6 is a diagram illustrating an indication sign criterion value table according to at least one embodiment of the invention.

An indication signal criterion value table according to an embodiment of the invention will be described below. FIG. 6 is a diagram illustrating an indication sign criterion value table according to at least one embodiment of the invention. An indication sign criterion value table 50 is set in the RAM 12 and is used to specify a criterion value, which is determined for each type of the indication sign 33, for determining a player's input operation.

The indication sign criterion value table 50 stores criterion values 52 in correlation with types 51 of the indication signs (corresponding to the types 42). An input operation input by a player is analyzed and the propriety thereof is determined on the basis of the criterion value 52. For example, when the analysis result of the input operation input from the player is within a range of −10% to +10% of the criterion value 52, the input operation is determined to be proper. When the analysis result is within a predetermined error from the criterion value, it can be determined that the input operation is properly performed.

In case of the "tipping tap", a direction vector indicating the shift direction of the finger or the like and a shift distance in a tipping operation with the finger are set as the criterion value 52. When an input operation is performed by a player, the direction vector and the shift distance at the time of the player's shifting a finger or the like are analyzed from the result of the player's input operation, are compared with the direction vector and the shift distance as the criterion value 52, and the propriety thereof is determined. In case of the "long pressing and tipping tap", a touch time in the long pressing operation and a direction vector indicating a shift direction of the finger or the like and a shift distance in the tipping operation with the finger or the like are set as the criterion value 52. In case of the "fluctuation", a shift distance of the finger or the like in the operation of shifting the finger or the like to the left or right is set as the criterion value 52. In case of the "pinch-in" and the "pinch-out", the distance between two touch positions and the shift distance of the touch positions at the times of starting and ending the input operation are set as the criterion value 52.

Figure 7:
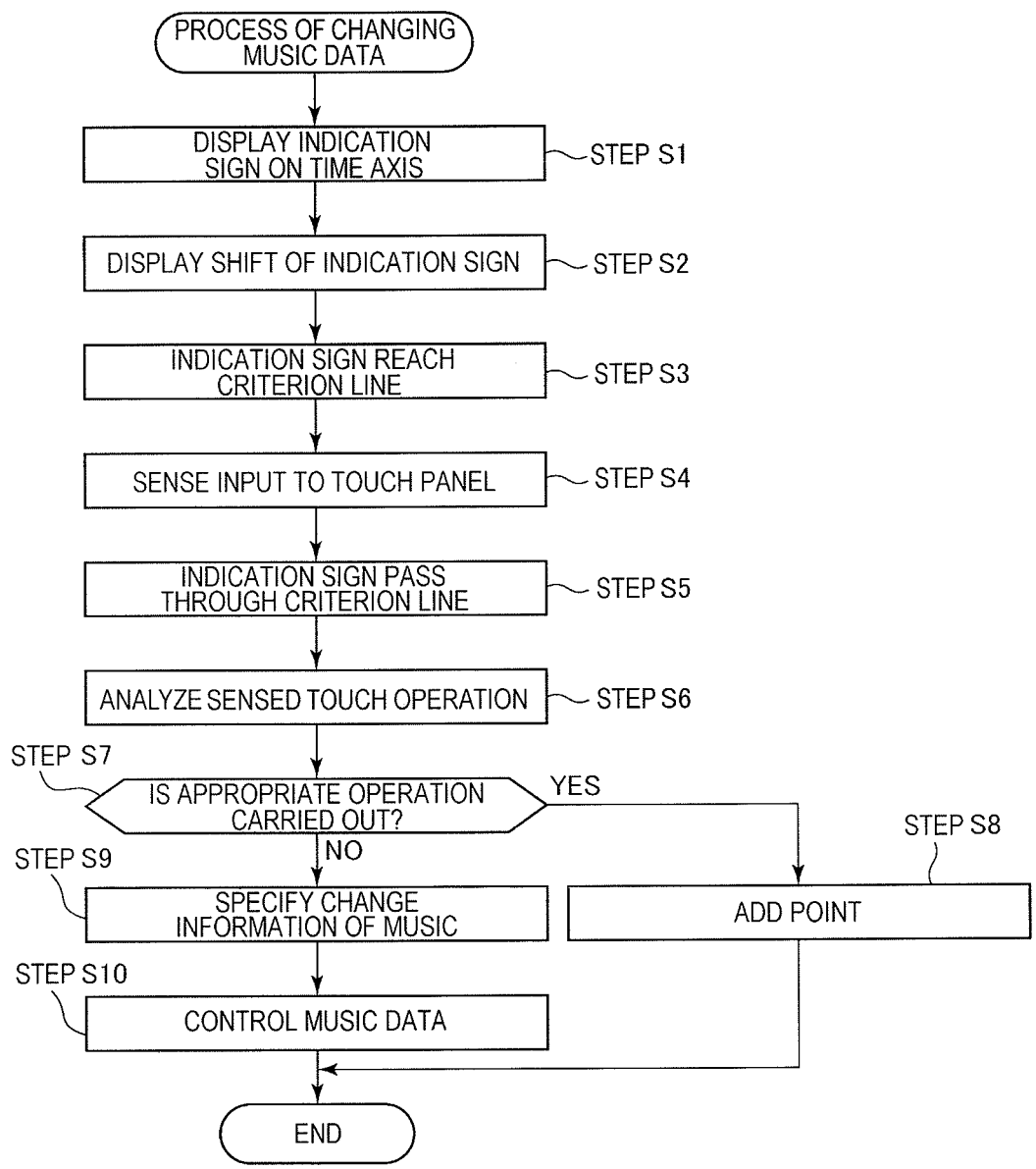
FIG. 7 is a flowchart illustrating a music data changing process according to at least one embodiment of the invention.

A music data changing process according to an embodiment of the invention will be described below. FIG. 7 is a flowchart illustrating a music data changing process according to at least one embodiment of the invention. First, time is counted with the start of playing a piece of music, an indication sign 33 is displayed at the right end of the time axis 31 on the basis of the indication sign management table 40 (step S1). With the lapse of time, the indication sign 33 is displayed to move from the right to the left on the time axis 31 (step S2).

The indication sign 33 moves on the time axis 31 and reaches the criterion line 32 (step S3), an input to the touch panel from a player is sensed by the touch input detecting unit 17 (step S4). Then, when the indication sign 33 passes through the criterion line 32 (step S5), the input operation sensed in step S4 is analyzed (step S6). The time until the indication sign 33 passes through the criterion line 32 after reaching the criterion line 32 is a determination time for determining the player's input operation, and the input operation performed within the determination time is an analysis target. Therefore, the determination time is specified depending on the size or the shape of the indication sign 33. The touch time of the finger or the like with the touch panel and the shift distance and the shift direction of the touch position of the finger or the like with the touch panel are specified by the analysis of the input operation in step S6.

When the input operation is analyzed in step S6, the propriety of the analysis result on the player's input operation is determined on the basis of the criterion value 52 corresponding to the indication sign 33 as a determination target with reference to the indication sign criterion value table 50 (step S7). When the touch time, the shift distance, and the shift direction specified by the analysis result are within predetermined ranges from the criterion value 52, it is determined that a proper operation is performed. On the other hand, when the touch time, the shift distance, and the shift direction are out of the predetermined ranges from the criterion value 52, it is determined that a proper operation is not performed. When the indication sign 33 corresponds to the "tap", the "tap" provides no concept of a criterion value 52 and thus it is a determination target only whether an input operation is performed until the indication sign 33 passes through the criterion line 32 after reaching the criterion line 32.

When it is determined that a proper operation is performed (YES in step S7), a point is added as the determination result (step S8). The piece of music continues to be played without particularly changing the piece of music.

When it is determined that a proper operation is not performed (NO in step S7), music change information is specified on the basis of the analysis result in step S6 and the criterion value 52 corresponding to the indication sign 33 as the determination target (step S9). When it is determined in step S7 that a proper operation is not performed, a point may be subtracted before perform the process of step S9.

When the music change information is specified in step S9, the pitch, the tempo, and the like of the music data are controlled on the basis of the specified change information (step S10) and the music data is reproduced. When the control of the pitch, the tempo, and the like of the music data is ended, the music data is reproduced normally. The processes of steps S1 to S10 are repeatedly performed until the playing of a piece of music is ended after being started.

The music change information is specified in step S9, but the correlation between the difference of the analysis result from the criterion value and the degree of change of the pitch, the tempo, and the like is determined in advance for each indication sign 33. For example, the pitch is changed when there is a difference in the direction vector of the tipping tap, and the tempo is changed when there is a difference in the shift distance of the tipping tap. The correlation is similarly determined for the long pressing and tipping tap and the fluctuation as well as the tipping tap.

The sound volume may be changed as well as the pitch and the tempo. When a player fails to perform the input operation corresponding to an indication sign 33, a sound volume may be temporarily increased or decreased from a criterion sound volume.

FIG. 8 is a diagram illustrating the correlation between a difference of an analysis result from a criterion value and a degree of change of a pitch and a tempo according to at least one embodiment of the invention. In step S9, the music change information is specified on the basis of the ratio of the analysis result of the player's input operation to the criterion value 52 with reference to the predetermined correlation illustrated in FIG. 8. The same correlation is determined in advance for the indication signs 33 other than the tipping tap.

For example, it is assumed that an input operation is proper when the analysis result of the shift distance of a touch position of a finger is within −10% to +10% of the criterion value 52. Then, as illustrated in FIG. 8, the tone is lowered by a semitone from a tone as a reference (hereinafter, referred to as a reference tone) stored in the music data when the analysis result of the shift distance is less than −10% of the criterion value 52 and equal to or greater than −20% of the criterion value 52, and the tone is lowered by a whole tone from the reference tone when the analysis result of the shift distance is less than −20% of the criterion value 52. That is, the tone of "DO" is changed to the tone of "TI" when the analysis result is less than −10% of the criterion value 52 and equal to or greater than −20%, and the tone of "DO" is changed to the tone of "LA#" when the analysis result is less than −20% of the criterion value 52. On the contrary, the tone is raised by a semitone from the reference tone when the analysis result is greater than 10% of the criterion value 52 and equal to or less than 20%, and the tone is raised by a whole tone from the reference tone when the analysis result is greater than 20% of the criterion value 52.

As for the shift direction of the touch position of the player's finger, as illustrated in FIG. 8, the degree of change of the music data can be determined on the basis of the inner product of the direction vector as the criterion value and the direction vector in the actual input operation.

When the analysis result occupies a predetermined ratio in the criterion value 52, the degree of change of the tone or the tempo may not be set to a fixed value but may be set to a random value using a random number. FIG. 9 is a diagram illustrating the correlation between a difference of the analysis result from the criterion value and the limit value of the degree of change of the pitch and the tempo according to at least one embodiment of the invention. As illustrated in FIG. 9, for example, it is assumed that an input operation is proper when the analysis result of the shift distance of the touch position of a finger is within a range of −10% to +10% of the criterion value 52. Then, the tone is lowered from the reference tone with a semitone as a limit when the analysis result is less than −10% of the criterion value 52 and equal to or greater than −20%, and the tone is lowered from the reference tone with a whole tone as a limit when the analysis result is less than −20% of the criterion value 52.

Figure 10A:
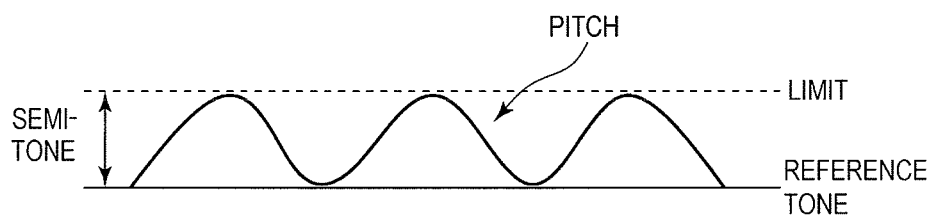
FIGS. 10A to 10C are conceptual diagrams illustrating a range of a change of a pitch with respect to a reference tone according to at least one embodiment of the invention.
Figure 10B:
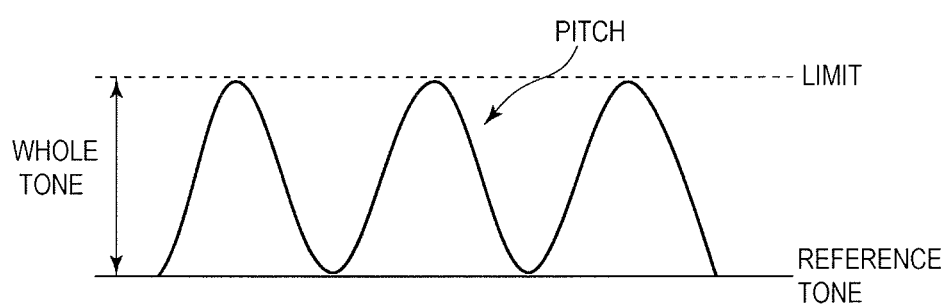
Figure 10C:
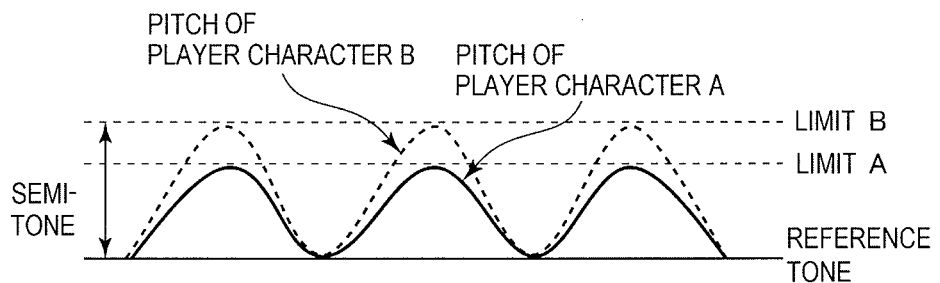

FIGS. 10A to 10C are conceptual diagrams illustrating a range of a change of a pitch with respect to a reference tone according to at least one embodiment of the invention. The straight lines indicated by a horizontal solid line in FIGS. 10A to 10C represents a reference tone, and a horizontal dotted line above the solid line represents a limit pitch when the pitch is changed. The pitch is controlled within the range between the straight line representing the reference tone and the dotted line above the straight line. The waved line represents a pitch when the pitch of the reference tone is controlled, and it can be seen therefrom that the degree of change of the actual pitch is specified randomly within the range of the upper limit in the degree of change of the pitch.

FIG. 10A corresponds to a case where the limit value of the degree of change of the pitch is set to a semitone in FIG. 9, and FIG. 10B corresponds to a case where the limit value of the degree of change of the pitch is set to a whole tone in FIG. 9. As can be clearly seen from comparison of FIGS. 10A and 10B, the degree of change of the pitch is randomly determined in any case. Accordingly, in some cases, when the analysis result is less than −20% of the criterion value 52, the degree of change is smaller than when the analysis result is less than −10% of the criterion value 52 and equal to or greater than −20%.

When the requested input operation is not performed for the same indication sign 33, the limit value of the degree of change of the pitch, the tempo or the like can vary depending on the player characters appearing in the game. For example, by multiplying the limit value of the degree of change acquired from the criterion value and the analysis result by a coefficient predetermined for each player character on the basis of the correlation illustrated in FIG. 9, the upper limit value of the degree of change can be changed for each player character.

For example, FIG. 10C illustrates a difference of the limit of the degree of change of the pitch from the reference tone for each of player character A and player character B. On the basis of the correlation illustrated in FIG. 9, when the limit value of the degree of change acquired from the criterion value and the analysis result is a semitone, the coefficient of player character A is 1 and the pitch thereof is controlled with the semitone as a limit, but the coefficient of player character B is equal to or more than 1 and the pitch thereof may be changed by a semitone or more from the reference tone.

Only one tone output almost at the same time as the timing at which the indication sign 33 passes through the criterion position 32 out of the music data may be used as a target to be changed in the pitch, the tempo, and the like, or one phrase or several seconds from the tone output almost at the same time as the timing at which the indication sign passes through the criterion position 32 may be used as a target to be changed in the pitch, the tempo, and the like. These settings can be appropriately designed depending on a concept of a game or a level of difficulty.

Known techniques can be used as the technique of controlling the pitch, the tempo, and the formant of music data in real time. In general, the pitch may be changed when the tempo is changed or the music playing speed or the formant may be changed when the pitch is changed. However, by simultaneously controlling these three factors, it is possible to change the tempo while maintain the pitch or to change the pitch while maintain the music playing speed or the formant.

When music data includes plural tracks, the pitch, the tempo, and the like may be controlled for all music data of all the tracks, or the pitch, the tempo, and the like may be controlled for only the music data of some tracks. It can be appropriately designed which of these methods should be employed.

Figure 11A:
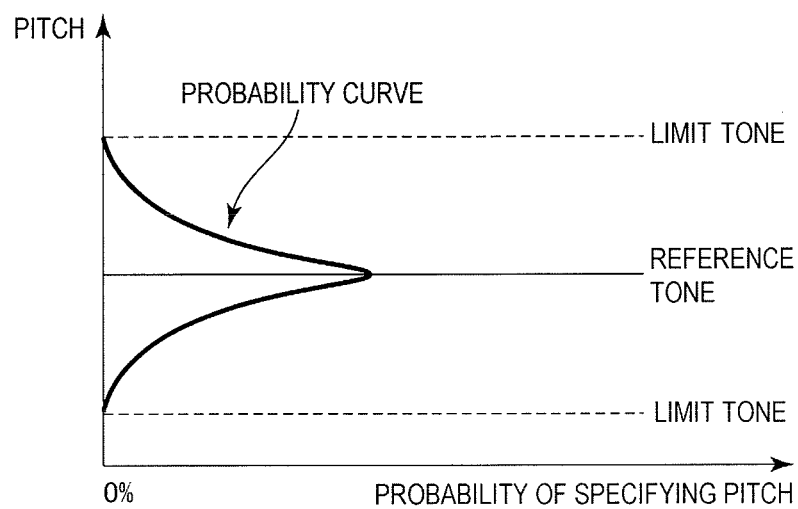
FIGS. 11A to 11C are conceptual diagrams illustrating a probability distribution of a change of a pitch with respect to a reference tone according to at least one embodiment of the invention.
Figure 11B:
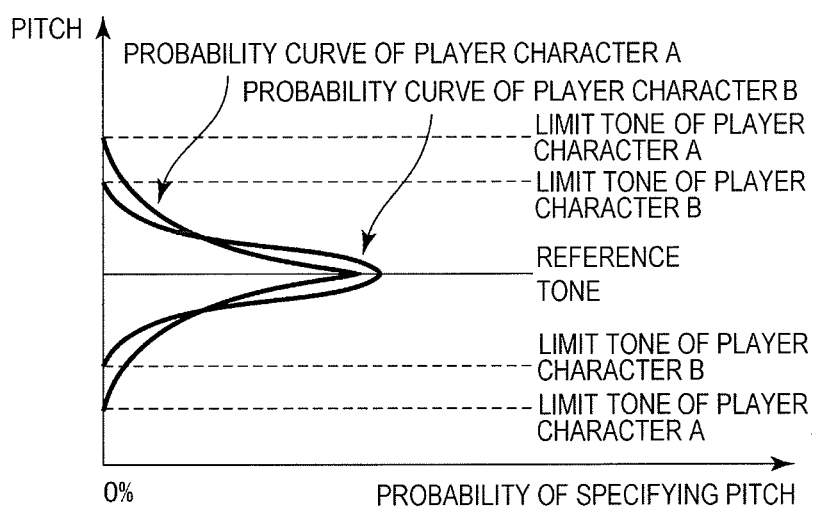
Figure 11C:
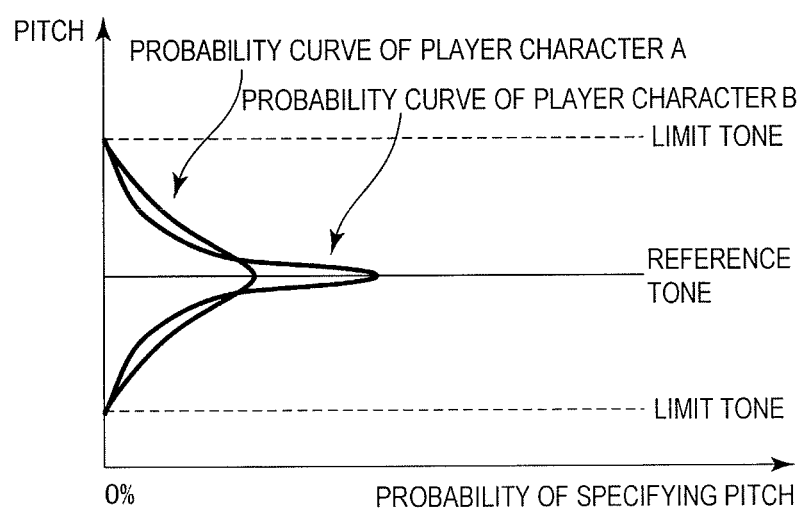

FIGS. 11A to 11C are conceptual diagrams illustrating a probability distribution of the change of the pitch with respect to the reference tone according to at least one embodiment of the invention. In FIGS. 11A to 11C, the vertical axis represents a degree of change of the pitch. In the vertical axis, the sound frequency becomes higher (that is, the pitch becomes higher) as it goes ahead in the positive direction. In the vertical axis, the sound frequency becomes lower (that is, the pitch becomes lower) as it goes ahead in the negative direction. On the other hand, the horizontal axis represents a probability of specifying a pitch. For example, when a tone is changed from the reference tone to a high tone, the pitch after the change can be specified along the probability curve illustrated in FIGS. 11A to 11C. As can be seen from FIG. 11A, the probability when the pitch is not changed from the reference tone is the highest, and the probability of specifying the pitch is gradually reduced as the pitch becomes higher. The probability of a limit tone at which the degree of change of the pitch is a limit value becomes close to 0%. The value obtained by integrating the probability from the reference tone to the limit tone is 100%.

FIG. 11B is a diagram illustrating a probability curve when the limit tone varies depending on the player characters. In FIG. 11B, the limit tone of player character A is higher than the limit tone of player character B, and the probability curve has a broad shape. FIG. 11C is a diagram illustrating a probability curve when both player characters have the same limit tone but have probability curves having different shapes. In FIG. 11C, player character A and player character B have the same limit tone but the probability curve of player character B has a sharper shape. In this way, by giving a change to the limit tone and the shape of the probability curve depending on the player characters, a player can specify a player character to be operated in consideration of personality of characters.

The above-mentioned embodiments mainly describe that music data is controlled and reproduced when a player does not perform an input operation corresponding to an indication sign, but the invention is not limited to the embodiments. For example, when the input operations corresponding to indication signs are successively performed a predetermined number of times, the tone of music data corresponding to a hook may be raised by a whole tone and particularly-excited performance may be directed.

The above-mentioned embodiments mainly describe that an input operation is performed on a touch panel type display device, but the invention may be implemented using a game apparatus having an input device including an acceleration sensor and a gyro sensor in another embodiment. First, time is counted with a start of playing of a piece of music, and an indication sign 33 is displayed at the right end of the time axis 31 on the basis of the indication sign management table 40. The indication sign 33 is displayed to move from right to left on the time axis 31 with the lapse of time. When the indication sign 33 moves on the time axis 31 and reaches the criterion line 32, the magnitude of the acceleration and the magnitude of the angular velocity based on the movement of the input device are detected by the use of the acceleration sensor and the gyro sensor included in the input device. Then, when the indication sign 33 passes through the criterion line 32, the shift distance and the shift direction of the input device are analyzed on the basis of the detected magnitude of the acceleration and the detected magnitude of the angular velocity. The time until the indication sign 33 passes through the criterion line 32 after reaching the criterion line 32 is the determination time for determining the player's shift operation and the shift operation performed within the determination time is to be analyzed.

When the shift operation is analyzed, the propriety of the analysis result is determined on the basis of the criterion value 52 corresponding to the indication sign 33 as the determination target with reference to the indication sign criterion value table 50. When the shift time, the shift distance, and the shift direction specified by the analysis result are within predetermined ranges from the criterion value 52, it is determined that a proper input operation is performed. On the other hand, when the specified values are not within the predetermined ranges from the criterion value 52, it is determined that a proper input operation is not performed. Subsequently, the pitch, the tempo, and the like of music data are controlled depending on the determination result. As a result, the upper limit of the degree of change of the pitch, the tempo, and the like is calculated, the actual degree of change is randomly acquired within the range of the upper limit value of the degree of change, and thus the music data is controlled.

The above-mentioned embodiments mainly describe that a smartphone is employed as a game apparatus, but the invention may be applied to a so-called cloud game. In a cloud game, generally, operation information input to a client apparatus by a player is transmitted to a server apparatus, a game progressing process is performed on the basis of the operation information in the server apparatus, game image data for displaying an image on the client apparatus is created by the server apparatus, and the created game image data is transmitted to the client apparatus. A game image and a sound are streaming-delivered to the client apparatus.

Figure 12:
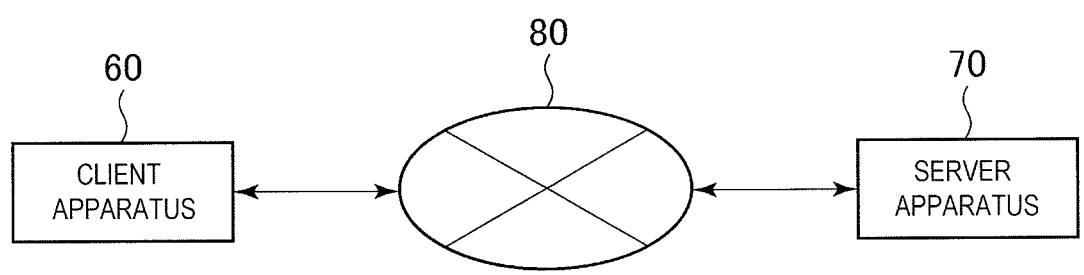
FIG. 12 is a block diagram illustrating a configuration of a game system according to at least one embodiment of the invention.

FIG. 12 is a block diagram illustrating a configuration of a game system according to at least one embodiment of the invention. A client apparatus 60 and a server apparatus 70 can communicate with each other via a communication network 80. The server apparatus 70 receives operation information input to the client apparatus 60 and analyzes the input operation on the basis of the received operation information. In the display device of the client apparatus, the time until an indication sign 33 passes through a criterion line 32 after reaching the criterion line 32 is the determination time for determining a player's input operation and the input operation performed within the determination time is to be analyzed.

When the input operation is analyzed by the server apparatus 70, the propriety of the analysis result of the player's input operation is determined on the basis of the criterion value 52 corresponding to the indication sign 33 as the determination target with reference to the indication sign criterion value table 50. When the touch time, the shift distance, and the shift direction specified by the analysis result are within predetermined ranges from the criterion value 52, it is determined that a proper input operation is performed. On the other hand, when the specified values are not within the predetermined ranges from the criterion value 52, it is determined that a proper input operation is not performed.

When it is determined that a proper operation is performed, game image data based on the determination result is created, and the game image data and the music data are transmitted from the server apparatus 70 to the client apparatus 60 in synchronization with each other. As a result of the determination, when it is determined that a proper operation is not performed, music change information is specified, game image data based on the determination result is created, and the game image data and the music data are transmitted from the server apparatus 70 to the client apparatus 60 in synchronization with each other. In the client apparatus 60, a game screen is displayed on the display device on the basis of the received game image data and a piece of music is played by the sound reproducing device on the basis of the received music data.

REFERENCE SIGNS LIST 1 game apparatus
11 central processing unit (CPU)
12 random access memory (RAM)
13 read only memory (ROM)
14 hard disk drive (HDD)
15 sound processing unit
16 graphic processing unit
17 touch input detecting unit
18 communication interface
19 interface unit
2 apparatus main body
20 frame memory
21 antenna
3 liquid crystal monitor
31 time axis
32 criterion position
33 indication sign
4 input unit
40 indication sign management table
5 speaker
50 criterion value table
60 client apparatus
70 server apparatus
80 communication network

The invention claimed is:

1. A non-transitory computer-readable recording medium having recorded thereon a game program which is executed by a computer apparatus including an input, a display, and a sound processor, and which causes the computer apparatus to serve as:
an interface that receives a player input operation via the input;
a memory that stores music data;
a speaker that plays a piece of music through the use of the sound processor;
a graphics processor that displays an indication sign correlated with an input operation to be input by a player through the use of the input on a display screen of the display in synchronization with a playing of the piece of music by the speaker; and
a central processor that determines a propriety of the player input operation based on the input operation, which corresponds to the indication sign displayed by the graphics processor, to be input by the player,
wherein the sound processor changes and reproduces the music data stored in the memory depending on a determination result of the central processor, and
a pitch of the music data is prevented from being changed when a tempo of the music data is changed.

2. The non-transitory computer-readable recording medium according to claim 1, wherein the speaker reproduces the music data stored in the memory with at least one of a pitch, a tempo, and a format of the music data being changed depending on the determination result of the central processor.

3. The non-transitory computer-readable recording medium according to claim 1, wherein:
the memory stores a criterion value for determining a propriety of the player input operation in correlation with the indication sign,
the central processor analyzes the input operation received by the interface,
the central processor determines an analysis result based on the criterion value stored in the memory, and
change details of the music data are determined based on a difference between the criterion value and the analysis result, the music data being changed and reproduced based on the change details.

4. The non-transitory computer-readable recording medium according to claim 1, wherein change details of the music data are determined depending on a player character appearing in the game program, the music data being changed and reproduced based on the change details.

5. The non-transitory computer-readable recording medium according to claim 1, wherein
the graphics processor further displays a time axis and a criterion position set on the time axis on the display screen of the display,
the graphics processor displays the indication sign to shift on the time axis in synchronization with the playing of the piece of music by the speaker, and
the central processor determines the propriety of the player input operation through the use of the input based on the input operation, which corresponds to the indication sign, to be input by the player in a period of time until the indication sign, displayed to move by the graphics processor, passes through the criterion position after reaching the criterion position.

6. The non-transitory computer-readable recording medium according to claim 1, wherein the input and the display comprise a touch panel type display, and
the input operation is a touch operation with the touch panel type display.

7. A game system, comprising:
a client apparatus that has an input, a display, and a sound processor; and
a server apparatus that is able to communicate with the client apparatus,
wherein the client apparatus includes:
an interface that receives a player input operation via the input;
a communication interface that transmits input operation information on the player input operation received by the interface to the server apparatus;
the communication interface that receives game image information for displaying a game image including an indication sign correlated with an input operation to be input by a player through use of the input on the display and music data for playing a piece of music through use of a sound processor from the server apparatus;
a graphics processor that displays the game image on the display based on the game image information received by the communication interface; and
a speaker that plays the piece of music through use of the sound processor based on the music data received by the communication interface,
the server apparatus includes:
a memory that stores the music data;
a receiver that receives the input operation information from the client apparatus;
a processor that determines the player input operation depending on the input operation information received by the receiver based on the input operation, which corresponds to the indication sign included in the game image displayed on the display, to be input by the player,
controls the music data stored in the memory based on a determination result, and creates the game image information for displaying the game image including the indication sign and indicating a game progressing state based on the determination result; and a transmitter that transmits the music data controlled by the processor and the game image information created by the processor to the client apparatus, and wherein, when controlling the music data stored in the memory based on the determination result, a pitch of the music data is prevented from being changed when a tempo of the music data is changed.

8. A non-transitory computer-readable recording medium having recorded thereon a game program which is executed by a server apparatus being able to communicate with a client apparatus having an input, a display, and a sound processor, and which causes the server apparatus to serve as:

a memory that stores music data, and stores an indication sign included in a game image to be displayed on the display in correlation with an input operation to be input by a player;

a receiver that receives input operation information on a player input operation to the input, which is received by the client apparatus, from the client apparatus;

a processor that determines the player input operation based on the input operation information received by the receiver based on the input operation, which corresponds to the indication sign included in the game image to be displayed on the display, to be input by the player, controls the music data stored in the memory based on a determination result, and creates game image information for displaying the game image including the indication sign and indicating a game progressing state based on the determination result on the display; and a transmitter that transmits the music data controlled by the processor and the game image information created by the processor to the client apparatus, wherein, when controlling the music data stored in the memory based on the determination result, a pitch of the music data is prevented from being changed when a tempo of the music data is changed.

* * * * *